A. J. DIBBLE.
Whiffletrees.

No. 154,380. Patented Aug. 25, 1874.

WITNESSES:
Chas. Nida
O. Sedgwick

INVENTOR:
A. J. Dibble
BY
ATTORNEYS.

UNITED STATES PATENT OFFICE.

ANDREW J. DIBBLE, OF FRANKLIN, NEW YORK, ASSIGNOR TO HIMSELF AND DANIEL MILLER, OF SAME PLACE.

IMPROVEMENT IN WHIFFLETREES.

Specification forming part of Letters Patent No. 154,380, dated August 25, 1874; application filed April 25, 1874.

*To all whom it may concern:*

Figure 1:
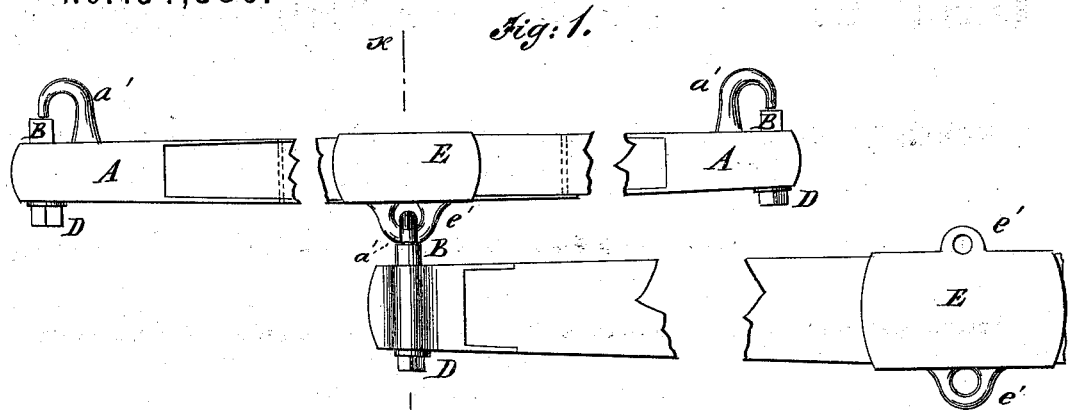
Figure 2:
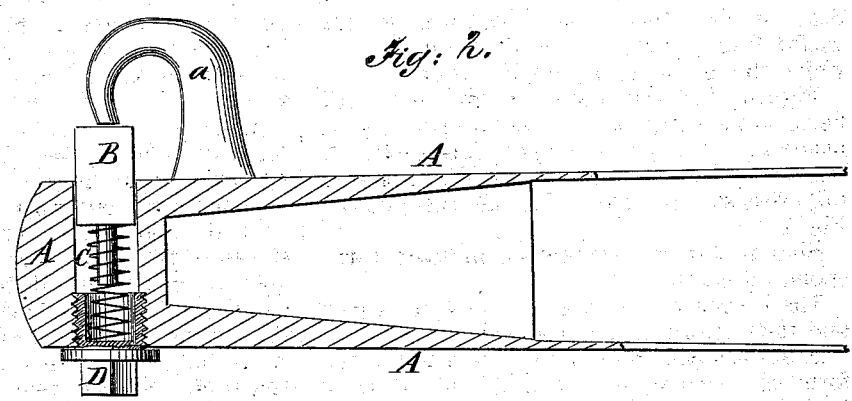
Figure 3:
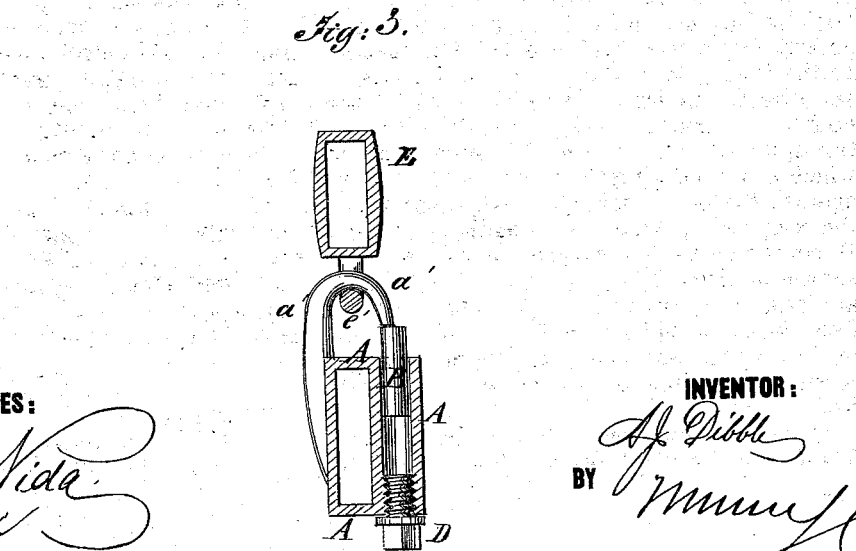

Be it known that I, ANDREW J. DIBBLE, of Franklin, in the county of Delaware and State of New York, have invented a new and useful Improvement in Whiffletree-Irons, of which the following is a specification:

Figure 1 is a top view of my improved whiffletree-irons arranged in their proper relative positions. Fig. 2 is a longitudinal section of one of the end or hook irons. Fig. 3 is a detail cross-section taken through the line $x\,x$, Fig. 1.

Similar letters of reference indicate corresponding parts.

The invention will first be fully described, and then pointed out in the claim.

A are the end irons, which are made in the form of a socket, and have a hook, $a^1$, upon their forward side, the hooks $a^1$ being cast in one piece with the body of the irons, and the cavity or socket extending outward past the base of the hooks, as shown in Fig. 2. This construction is much stronger than when the hook is beyond the end of the wood, and greatly diminishes the liability of breakage. In the end part of the end or hook irons A, and directly opposite the end or point of the hook $a^1$, is formed a hole extending entirely through said irons, and in the forward end of which is placed a block, B, which is held out against the said hook by a coiled spring, C, the rear end of which rests against a screw, D, screwed into the rear end of said hole, as shown in Figs. 2 and 3. The hook-irons A are cast with an arm, $a^2$, extending inward from the inner edge of their rear sides, to extend along the rear side of the whiffletree, and serve as a rub-iron to protect the whiffletree from wear.

When the hook-irons A are to be attached to the ends of a double-tree they should be cast with the points of the hooks $a^1$ upward, to bring them into proper position to receive the staple of the single-trees, and when they are to be attached to the ends of a single-tree they should be cast with the points of the hooks outward to bring them into proper position to receive the tug-eyes.

E are the center-irons, which are cast in the form of a band, and with a staple, $e^1$, cast upon their rear sides.

When the center-irons E are to be placed upon the double-tree they should also have a staple or perforated lug or projection, $e^2$, cast upon their forward side to receive the hammer handle of bolt, by which they are secured to the tongue of the vehicle. The center-irons E may also have straps or arms cast upon the end edges of their rear sides to receive the screws by which they are secured in place.

This construction enables the center-iron of the double-trees to be readily moved to one side of the center when it is desired to give one horse an advantage of leverage.

I am aware it is not new to provide hook-irons for whiffletrees with a spring-pressed block to prevent the trace from becoming casually detached, and I, therefore, made no claim to such, broadly; but What I do claim as of my invention herein is—

The hook-iron A $a^1$, provided near its outer end with a transverse opening in which is adapted to slide a block, B, in combination with said block B, supporting-spring C, and adjusting-screw D, constructed and applied as and for the purpose specified.

ANDREW J. DIBBLE.

Witnesses:
G. H. GOODMAN,
S. A. MANWARING.